Patented Dec. 16, 1947

2,432,577

UNITED STATES PATENT OFFICE 2,432,577

SMOKE SCREEN COMPOSITION

Harold A. Levey and Alonzo C. Patterson, New Orleans, La.; said Levey assignor to said Patterson No Drawing. Application May 2, 1942, Serial No. 441,550

2 Claims. (Cl. 252—305)

The present invention is directed to a smoke screen composition adapted to produce a dense smoke-screen or cloud for military, maritime and peaceful purposes, including the obscuring of land operations and maritime movements.

The composition of the present invention contains a smoke producing ingredient such as a combination of a mineral oil hydrocarbon and an inorganic salt which will vaporize at a temperature of approximately 300° F. to 750° F. or less, but preferably in the neighborhood of 375° F. to 400° F., and will also have the property of imparting to the smoke screen generated by the composition an opacity and density which enables the smoke screen to hug the ground or articles which it contacts, and which also increases the longevity of the smoke screen. There is also present in the smoke producing composition a viscosity-inducing agent capable of maintaining the solid particles of the inorganic salt in suspension or in dispersion in the mineral oil hydrocarbon base for a relatively long time and over a varying temperature range. For example, the volatile inorganic capacity and density producing ingredient should be maintained in suspension for a period of six or more months over a temperature range varying between —40° F. to 120 to 135° F.

While broadly any viscosity inducing agent may be used which will maintain the opacity producing material such as the dry volatile inorganic salts in suspension during the time the composition is kept, transported and stored, preferably the viscosity-inducing agent is a metallic soap of a saturated fatty acid having fifteen or more carbon atoms, as these soaps produce a desirable gel free from any granular structure. However, other viscosity-inducing agents are the petroleum, vegetable and animal waxes and the aliphatic and aromatic cellulose ethers. The metallic soaps of the high molecular weight saturated fatty acids are soluble in the petroleum oil base, as for example those commonly known as "lubricating oils."

Where the viscosity-inducing agent is not soluble in the mineral oil smoke producing base, it may be dispersed in the oil. This is necessary when using animal and vegetable waxes. When the viscosity-inducing agent of the smoke evolving composition is insoluble in the mineral oil or other base thereof, instead of depending merely on mechanical dispersion, the viscosity-inducing agent may be dissolved in a medium which is a mutual solvent for the viscosity-inducing agent and the mineral oil base. For example, using animal and vegetable waxes as a viscosity inducing agent, the waxes may be dissolved in spirits of turpentine, glacial or anhydrous acetic acid, and the chlorinated hydrocarbons which are solvents of the mineral oil bases, as for example, carbon tetrachloride, chloroform, ethylene dichloride and the like. Having once perceived the necessity of having a mutual solvent for the viscosity-inducing agent and the mineral oil base, those skilled in the art may select solvents which are equivalents of those hereinbefore set forth.

It is desired to point out that the smoke screen or cloud produced from the composition of the present invention develops a density and opacity greater than that of the heaviest known natural fog. The opacity producing particles result from the vaporized mineral oil and the vaporized inorganic salt. The smoke screen composition on heating and appropriate processing, furnishes a smoke screen or cloud in which the mineral oil base is unburned and exists in the form of a vapor or atomized state dispersed and suspended in the atmosphere. The inorganic salt which assists in producing a smoke screen of appropriate density and opacity also exists in the form of a vapor or atomized state in admixture with the vaporized oil, both components being suspended in the atmosphere.

The invention will be disclosed in connection with the following examples which are to be taken as illustrative and not as a limitation upon the scope of the invention:

Example 1

| | Percent by weight |
|---|---|
| Lubricating oil | 87 |
| Sodium stearate | .50 |
| Dry ammonium chloride crystals | 12.50 |

Example 2

| | |
|---|---|
| Lubricating oil | 85 |
| Ceresine wax | 1 |
| Dry ammonium chloride crystals | 14 |

Example 3

| | |
|---|---|
| Lubricating oil | 85.25 |
| Ethyl cellulose (41–44% combined ethoxy content) | .75 |
| Xylenes | 2 |
| Dibasic ammonium phosphate | 12 |

In all of the above examples, the lubricating oil was derived from a Gulf Coastal oil base, said lubricating oil having a specific gravity of 0.892 and an S. A. E. viscosity of 15 seconds (American Petroleum Institute specifications).

Referring to Example 1, it is to be noted that the preferred percentage of the viscosity inducing agent is about .50%, taken on the weight of the mixture, and that the preferred percentage of the volatile inorganic salt which functions to increase the opacity and density of the smoke screen is about 12.50%. The amount of viscosity-inducing agent present in the smoke evolving composition will vary in accordance with the amount of volatile inorganic salt present therein. In general, the latter may vary from about 5% to 20% taken on the weight of the smoke screen composition and the amount of the viscosity-inducing agent, as for example, the metallic soaps of the high molecular weight fatty acids, are adjusted sufficiently to increase the body or viscosity of the oil, so that it will retain in suspension the increased amount of substantially dry inorganic salt adapted to be volatilized at temperatures below 400 to 750° F. In general, the amount of viscosity-inducing agent present in the composition will vary between 0.25 to 1.5% taken on the weight of the smoke evolving composition.

While any of the prior art volatile salts of the inorganic acids may be dissolved or dispersed in a dry state through the mineral oil base, the inorganic salts which are most effective are the ammonium salts of inorganic acids, these salts having a relatively low volatility so that when volatilized they hug the ground or other article which is enveloped in the smoke screen. Suitable ammonium salts of inorganic acids are ammonium chloride, ammonium phosphates, and ammonium carbonates in a substantially dry condition. These salts are characterized by a low volatility which enables the smoke screen composition to perform the function of hugging the ground or article which it envelopes. It may be pointed out that it is highly desirable to use the crystals of the inorganic salts having low volatility at temperatures below 400 to 500° F. in a dry condition or with a minimum of molecules of water of crystallization, since experiments show that not only is a more effective screen produced, but a more stable composition is obtained and stability is of high importance, considering that it may be necessary to transport the smoke producing composition thousands of miles.

Further, it is desirable that the volatile inorganic salts functioning in the evolved smoke screen as an auxiliary opacifying and densifying medium, be present in the smoke screen composition in a dry form so there will be no tendency to pack on standing, and when the material is fed to a smoke producing apparatus provided with a needle feed control, the needle will not be choked by the agglomeration of the inorganic salts. In short, it is preferable that the smoke screen composition be devoid of free water which will tend to agglomerate the granules of the crystals and tend to cause the composition to choke the feed valve of the smoke producing apparatus. As stated, the inorganic salts used to produce opacity and density may contain water of crystallization, but even this should be reduced to a minimum. Although water of crystallization is present, this is not free water and so the inorganic salts are in a dry condition during the time the smoke screen composition is stored and/or transported and when the composition is fed to the smoke producing apparatus.

While the alkali soaps of the saturated higher fatty acids in excess of fifteen carbon atoms give satisfactory results as the viscosity-inducing agent, other soaps of the higher saturated fatty acids in excess of 15 carbon atoms may be used as, for example, any of the soaps of the alkaline earth group including barium stearate or barium palmitate. The strontium soap of said saturated higher fatty acids is the least effective, since it does not possess the good gelating characteristics possessed by the other alkaline earth soaps of said higher fatty acids. In addition, the aluminum, zinc and magnesium salts of said saturated higher fatty acids may be used as the viscosity inducing agent, said soaps being relatively white in color and producing a white cloud. In addition to using the soaps above set forth, iron, chromium, cobalt and manganese soaps of said higher saturated fatty acids may be used as a viscosity-inducing agent. While these latter soaps are black in color, this does not alter the viscosity-inducing characteristics of the soaps and is not detrimental to the smoke screen which may be evolved from the composition.

As specific examples of soaps which may be used, there is set forth aluminum stearate, calcium palmitate, magnesium stearate, and sodium myristate.

Referring to Example 3, it is to be noted that the viscosity-inducing agent is an aliphatic cellulose ether. It may be stated that the aliphatic and aromatic cellulose ethers function admirably to increase the viscosity or the body of the oil with the objective of retaining in suspension the powdered dry inorganic salt as, for example, ammonium phosphate.

In order to maintain the effectiveness of the cellulose ether, as, for example, ethyl cellulose at low temperatures, that is those below $-40°$ F., there is added to the smoke screen composition a small percentage of an aromatic hydrocarbon or a mixture thereof such as mixed xylenes, toluol or benzol. These hydrocarbons function to keep the cellulose ether in suspension at exceedingly low temperatures such as $-40°$ F. It is not desired to be limited to the specific hydrocarbons set forth, as equivalent agents may be used to perform the equivalent function. In general, the amount of auxiliary agent used to maintain the effectiveness of the cellulose ether viscosity-inducing agent at low temperatures varies from about 0.75 to 4% depending upon the chemical characteristics of the oil and its physical characteristics, including its S. A. E. viscosity and specific gravity. When using metallic soaps as the viscosity-inducing agent to maintain the dry inorganic salts in suspension or dispersion over a relatively long life, there may be added to the composition a pour point depressant which will prevent the occurring of excessive gelation or hardening at low temperatures of the liquid smoke producing composition containing in suspension dry particles of inorganic salts. For example, in order to prevent excessive gelation or hardening, there may be added to any of the compositions herein set forth three to nine parts per thousand, based on the weight of the mineral oil base used, of penta-chloro-phenol or similar types of pour point depressants. In order to prevent excessive fluidity at high temperatures of 120° F. or above, the amount of viscosity-inducing agent may be considerably increased. In other words, if the composition is to be stored or transported at a temperature of around 90° F., about one-half percent of sodium stearate or aluminum stearate may be used as a viscosity-inducing agent. On the other hand, if the temperature is about 120° F., the sodium stearate should be increased about 0.65%.

While in Example 3, ethyl cellulose has been set forth as the desired cellulose ether, similar aliphatic and aromatic cellulose ethers may be used as, for example, cellulose propyl ether, cellulose butyl ether, and cellulose benzyl ether with degrees of etherization of such values as will render these cellulose ethers soluble or dispersible in the petroleum hydrocarbons which in various states of liquidity may be used as the mineral oil base of the smoke screen composition.

In producing the smoke screen composition, the lubricating oil is heated to approximately 450° F. by means of a direct heat source as, for example, steam coils. Thereafter, the viscosity-inducing agent such as the metallic soaps herein set forth, the waxes and the organic cellulose compounds such as cellulose ethers, are added to the hot oil and the latter agitated. The viscosity-inducing agents are preferably substantially dry or in substantially anhydrous form. In other words, the viscosity-inducing agent should have little if any free water present. While the temperature above designated is usually adequate, if the metallic soap of the fatty acid does not pass into solution at said temperature, or if the other viscosity-inducing agent is not suitably dispersed, it will be necessary to raise the temperature and sustain the oil at such a higher temperature as may be required to cause the metallic soaps or other viscosity-inducing agent to pass into complete solution in the oil or to be adequately dispersed therein.

Thereafter, the oil is allowed to cool as, for example, to about 150 or 175° F., or the oil may be quickly cooled by passing the oil containing the viscosity-inducing agent such as a metallic soap through a heat exchanging device after which there are added crystals of an inorganic salt capable of imparting to the smoke screen composition opacity and density producing characteristics, said inorganic salt being typified by ammonium chloride, the ammonium phosphates, and other compounds specifically and broadly referred to. These particles of the inorganic salt may be about 12 mesh or finer. The soap mixture is then passed in a colloid mill or similar type of mechanical device which will crush or grind the dry inorganic crystals in the mineral oil base containing the viscosity producing agent in such a manner that all the particles of the dry inorganic salt as, for example, ammonium chloride, are separated and completely wetted on all their faces with a film of oil functioning to prevent agglomeration or coalescence of these particles. The smoke screen composition is then ready for packaging or for use.

While the mineral oil base used in carrying out the present invention may include any of the known types of lubricating oil, it is preferred to use a Gulf Coastal oil which has as its prevailing components a naphthenic base. In the examples herein set forth, this type of oil is referred to. However, other types of petroleum oils may be used such as the Mid-Continental variety which contains mixed asphaltic and paraffinic bases; the Pennsylvania type of oil having a paraffinic base, and the California type of oil which has an asphalt base. The cyclic oils of Russian origin may also be used equally as well as the Gulf Coastal oils referred to. In one form of the invention, the composition herein set forth may be characterized as being made up of two phases; namely a solid finely divided crystalline material suspended or dispersed in a liquid phase made up of a solution of metallic soap in a petroleum hydrocarbon.

In view of the above descriptive subject-matter, it then becomes apparent that the fog or screen herein described is then possessed of a structure made up of a plurality of minute spherical globules of an oily material carrying the viscosity producing agents described and in the proximity of or adjacent to these oil globules, there appears a multitude of particles of sublimed or solidified inorganic salt crystals obviously made up of the molecular aggregates of this composition and of dimensional values approximating fractions of a micron in size.

While the present invention has been primarily disclosed in connection with a mineral oil base, it is recognized that oily substances such as animal and vegetable fats and oils, petroleum waxes, organic solvents, crystalline and colloidal masses which are capable of being liquefied at the prevailing temperatures which exist in the exhaust manifold of automotive engines are equally suitable in carrying out the invention. In fact, the experimental work has shown that any type of product liquefied which will not readily evaporate in our prevailing atmospheric conditions will form globules as previously described and develop a more or less white opaque fog depending upon the mechanics of atomization. More specifically, clouds of this type have been produced, made up of asphaltum, coal tar pitch, various types of residua from petroleum distillates, tarry residues from the distillation of wood and similar vegetable products, as well as derivatives obtained in the process of both high and low temperature distillation of coals, lignite, peat, as well as the various recognized chemical solvents such as the chlorinated hydrocarbons, nitro-hydrocarbons, amino derivatives of the hydrocarbons, ketones, aldehydes, acids, and esters. This involves merely a physical change of state rather than a chemical reaction. In other words, the prerequisite conditions are that the base material must be capable of atomization in the conditions that prevail in the manifold of an automotive engine and must not be subject to combustion under those conditions.

It is desired to point out that when using the insoluble waxes as viscosity inducing agents, it obviously becomes necessary that this dispersion approximate a colloidal solution resulting in the formation of an ultimate product made up of two phases; namely, a liquid phase made up of the colloidal solution of wax and oil, on the one hand, and the suspension of the solid crystals in the oil as the second phase.

While the preferred material for imparting opacity and density to the smoke screen is a volatile inorganic salt, it is recognized that relatively dry organic compounds may be used which are capable of being volatilized at the temperature at which the smoke screen base material is volatilized and which are capable of being sublimed to form solid particles when the smoke screen is exposed to atmospheric temperatures.

While there are a great many dry organic compounds which may be used to impart opacity and density to the smoke screen, it is not thought necessary to specifically mention all of the materials as these will be well known to one skilled in the art. However, as illustrative compounds, mention may be made of naphthalene and phenyl salicylate as suitable for this purpose.

The present composition may be converted into a smoke screen by injecting the composition into the exhaust manifold of an internal combustion engine where the temperature will vary between 300° to 500° F., and it is for this reason that it has been stated that the dry particles imparting opacity and density to the smoke screen should volatilize to a temperature varying between 300° to 400° to 500° F. However, the smoke screen composition of the present invention may be injected into the exhaust manifold of a Diesel engine where the temperature will be considerably higher, as for example, in the neighborhood of 500° to 750° or 800° F. Therefore, while the dry inorganic or organic particles imparting opacity and density to the smoke screen should preferably volatilize between 300° to 500° F., particles may be used which will volatilize at higher temperatures when the smoke screen composition is converted at said higher temperaturess to a smoke screen. It is desired to again point out that in order to convert the composition to a smoke screen, the smoke screen base, as for example, a mineral oil, should be subjected to a temperature wherein the base is unburned and exists in the form of a vapor. Therefore, the limiting temperature for the volatilization of the dry particles is that at which the smoke screen base remains unburned and exists in the manifold of the smoke producing apparatus in the form of a vapor.

What is claimed is:

1. A smoke screen composition comprising a normally fluid mineral lubricating oil capable on heating at a temperature varying between 300° and 800° F. of vaporizing, and on condensing of forming globules resisting evaporation under atmospheric conditions, 5% to 20% of relatively dry particles of an inorganic volatile ammonium salt which volatilizes when the smoke screen base is heated at a temperature sufficient to vaporize said base, said dry particles imparting opacity and density to the smoke screen evolved on heating of the composition, all of said particles being wetted with a film of the fluid base material, said particles exhibiting little tendency to agglomerate, and 0.5% to about 1.5% of a substantially dry metallic soap of a saturated fatty acid having at least 15 carbon atoms, said salt keeping the solid components of the liquid composition in suspension during transportation and storage, said percentages being taken on the weight of the smoke screen composition.

2. A smoke screen composition comprising a normally fluid mineral lubricating oil capable on heating at a temperature varying between 300° and 800° F. of vaporizing, and on condensing of forming globules resisting evaporation under atmospheric conditions, 5% to 20% of relatively dry particles of an inorganic volatile ammonium salt which volatilizes when the smoke screen base is heated at a temperature sufficient to vaporize said base, said dry particles imparting opacity and density to the smoke screen evolved on heating of the composition, all of said particles being wetted with a film of the fluid base material, said particles exhibiting little tendency to agglomerate, and 0.5% to about 1.5% of a substantially dry alkaline earth soap of a high molecular weight saturated fatty acid having at least 15 carbon atoms which will keep the solid components of the liquid composition in suspension during transportation and storage of the composition, said percentages being taken on the weight of the smoke screen mixture.

ALONZO C. PATTERSON.
HAROLD A. LEVEY.

REFERENCES CITED

The following references are of record in the file of this patent:

UNITED STATES PATENTS

| Number | Name | Date |
|---|---|---|
| 1,461,646 | French et al. | July 10, 1922 |
| 2,173,756 | Kronenberg | Sept. 19, 1939 |
| 2,274,673 | Earle | Mar. 3, 1942 |
| 1,785,744 | Oglesby | Dec. 23, 1930 |
| 1,514,106 | Savage | Nov. 4, 1924 |
| 1,603,696 | Issaacs | Oct. 19, 1926 |
| 1,471,344 | Loudin | Oct. 23, 1923 |
| 2,079,051 | Sullivan et al. | May 4, 1937 |
| 1,963,901 | Hickman | June 19, 1934 |